United States Patent [19]
Beavin et al.

[11] Patent Number: 5,940,819
[45] Date of Patent: Aug. 17, 1999

[54] USER SPECIFICATION OF QUERY ACCESS PATHS IN A RELATIONAL DATABASE MANAGEMENT SYSTEM

[75] Inventors: Thomas Abel Beavin, Milpitas; Donald J. Haderle, Los Gatos; Akira Shibamiya, Los Altos; Hong Sang Tie, Morgan Hill; Yun Wang, Saratoga, all of Calif.

[73] Assignee: International Business Machines Corporation, Armonk, N.Y.

[21] Appl. No.: 08/920,531

[22] Filed: Aug. 29, 1997

[51] Int. Cl.[6] .................................................. G06F 17/30
[52] U.S. Cl. ................................. 707/2; 707/3; 707/101
[58] Field of Search ............................ 707/2, 3, 4, 506, 707/5, 8; 364/283, 284, 282; 395/200, 675; 341/50

[56] References Cited

U.S. PATENT DOCUMENTS

| | | | |
|---|---|---|---|
| 4,531,186 | 7/1985 | Knapman ................................. | 364/300 |
| 5,043,872 | 8/1991 | Cheng et al. ............................ | 364/200 |
| 5,367,675 | 11/1994 | Cheng et al. ................................. | 707/2 |
| 5,546,570 | 8/1996 | McPherson, Jr. et al. ............. | 395/600 |
| 5,546,573 | 8/1996 | Obermann et al. ...................... | 707/101 |
| 5,548,758 | 8/1996 | Pirahesh et al. ............................ | 707/2 |
| 5,822,750 | 10/1998 | Jou et al. .................................... | 707/2 |

OTHER PUBLICATIONS

P. G. Selinger et al., "Access Path Selection in Distributed Data Base Management Systems", Jul. 1980, pp. 204–215, International Conference on Data Bases, University of Aberdeen, Aberdeen, Scotland.

*Primary Examiner*—Wayne Amsbury
*Assistant Examiner*—Thu-Thao Havan
*Attorney, Agent, or Firm*—Gray Cary Ware Freidenrich

[57] ABSTRACT

A relational data base management system includes a query processor that permits consideration of alternative user-specified access paths, which the processor will validate and incorporate into the query execution plan it otherwise generates. The optimizer of the query processor retrieves user-specified data that defines an access path for a query during bind operations. Any access path parameters that are invalid are replaced with processor-selected values.

24 Claims, 7 Drawing Sheets

PAGE 1 ---------- VERSION DSNTEP3 E95H ----------

| | QUERYNO | QBLOCKNO | APPLNAME | PROGNAME | PLANNO | METHOD | CREATOR | TNAME | TAB110 |
|---|---|---|---|---|---|---|---|---|---|
| 1_ | 1 | 1 | | DSNTEP3 | 1 | 0 | RKEH | IRKEH1TD1MOVE | 3 |
| 2_ | 1 | 1 | | DSNTEP3 | 2 | 1 | RKEH | IRKEH5T16D0BK | 1 |
| 3_ | 1 | 1 | | DSNTEP3 | 3 | 1 | RKEH | IRKEH5T17EQCN | 2 |

PAGE 2 ---------- VERSION DSNTEP3 E95H ----------

| | ACCESS-TYPE | MATCHCOLS | ACCESS-CREATOR | ACCESS-NAME | INDEXONLY | SORTN_UNIQ | SORTN_JOIN | SORTN_ORDERBY |
|---|---|---|---|---|---|---|---|---|
| 1_ | I | 3 | RKEH | RKEH11A6 | N | N | N | N |
| 2_ | R | 0 | | | N | N | N | N |
| 3_ | I | 5 | RKEH | RKEH511700 | N | N | N | N |

PAGE 3 ---------- VERSION DSNTEP3 E95H ----------

| | SORTN_GROUPBY | SORTC_UNIQ | SORTC_JOIN | SORTC_ORDERBY | SORTC_GROUPBY | TSLOCK-NODE | TIMESTAMP |
|---|---|---|---|---|---|---|---|
| 1_ | N | N | N | N | N | IS | 19970214143211392 |
| 2_ | N | N | N | N | N | IS | 19970214143211392 |
| 3_ | N | N | N | N | N | IS | 19970214143211392 |

PAGE 4 ---------- VERSION DSNTEP3 E95H ----------

| | REMARKS |
|---|---|
| 1_ | |
| 2_ | |
| 3_ | |

FIG. 3

PAGE 5 ---------- VERSION DSNTEP3 E95H ----------

| | PREFETCH | COLUMN_FN_EVAL | MIXOPSEQ | VERSION |
|---|---|---|---|---|
| 1_ | | | 0 | |
| 2_ | S | | 0 | |
| 3_ | | | 0 | |

PAGE 6 ---------- VERSION DSNTEP3 E95H ----------

| | COLLID | ACCESS_ DEGREE | ACCESS_ PGROUP_ID | JOIN_ DEGREE | JOIN_ PGROUP_ID | SORTC_ PGROUP_ID | SORTN_ PGROUP_ID |
|---|---|---|---|---|---|---|---|
| 1_ | DSNTEP3 | ? | ? | ? | ? | ? | ? |
| 2_ | DSNTEP3 | ? | ? | ? | ? | ? | ? |
| 3_ | DSNTEP3 | ? | ? | ? | ? | ? | ? |

PAGE 7 ---------- VERSION DSNTEP3 E95H ----------

| | PARALLELISM_ NODE | MERGE_JOIN_ COLS | CORRELATION_ NAME | PAGE_ RANGE | JOIN_ TYPE | GROUP_ MEMBER | ACCESS_PATH |
|---|---|---|---|---|---|---|---|
| 1_ | ? | ? | HVST | | | | I |
| 2_ | ? | ? | DQBK | | | | |
| 3_ | ? | ? | EQCH | | | | |

USER SPECIFICATION OF QUERY ACCESS PATHS IN A RELATIONAL DATABASE MANAGEMENT SYSTEM

BACKGROUND OF THE INVENTION

1. Field of the Invention

This invention relates generally to database management systems and, more particularly, to efficient evaluation of SQL statements processed in relational database management systems.

2. Description of the Related Art

Information is frequently stored in computer processing systems in the form of a relational database. A relational database stores information as a collection of tables having interrelated columns and rows. A relational database management system (RDBMS) provides a user interface to store and retrieve the information and provides a query methodology that permits table operations to be performed on the data. One such RDBMS interface is the Structured Query Language (SQL) interface, which permits users to formulate operations on the data tables either interactively, or through batch file processing, or embedded in host languages such as C, COBOL, or the like.

SQL provides table operations with which users can request database information and form one or more new tables out of the operation results. Data from multiple tables, or views, can be linked to perform complex sets of table operations with a single statement. The table operations are specified in SQL statements called queries. One typical SQL operation in a query is the "SELECT" operation, which retrieves table rows and columns that meet a specified selection parameter. Another operation permitted by SQL is the "JOIN" operation, which concatenates all or part of two or more tables to create a new resulting table. For example, a query might produce a table that contains the names of all supervisory employees who live in a given city, and might do so by specifying a SELECT operation to retrieve employee names and resident cities from one table, and then performing a JOIN of that data after a SELECT operation to retrieve employee names and job titles from another table.

Evaluation of SQL Statements

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar table comparison operation. In an SQL system, a query is received through the SQL interface and is received by an SQL processor that rewrites the query from the input format provided by the user into generally standard SQL language, and also may include optimization processing performed by a query optimizer. An SQL query may be equivalently expressed in many different ways. The query optimizer typically chooses from among alternative combinations of SQL operators to ensure a query that may be more efficiently evaluated. For example, the SQL optimizer typically can determine how to organize intermediate results (intermediate tables) so data operations during evaluation are carried out with maximum efficiency.

To evaluate a query, an SQL execution plan is generated by the SQL processor from the parsed, optimized SQL input. To generate an execution plan, the SQL processor considers the available access paths to the data and considers system statistics on the data to be accessed to select what it considers to be the most efficient access path to evaluate the query and retrieve the results. In considering the available access paths, the processor checks table indexes, sequential read operations needed, and the like to determine how it will retrieve data. The system statistics considered in choosing from available access paths include statistics on the size of tables, the number of distinct values in columns of tables, the network locations of tables, and the like. Consideration of the available access paths and the system statistics yields the single access path determined to be the most efficient, which is selected for the execution plan. In this way, the SQL processor "binds" the access path to the query. Finally, the SQL interface executes the optimized query plan, retrieves the data, and provides the results to the user.

Selecting an Access Path

In some circumstances, it might be necessary to "rebind" the access path to a query. For example, the SQL application may have been changed, such as by adding new types of queries to the application. The attributes of the data tables may have changed, thereby changing the manner of specifying the access path. The user may want to change the query being evaluated. Even database maintenance can create a need for rebinding the access path to a query. For each of these types of changes, it may be necessary to rebind the access path to a query.

When a rebind operation is performed, the access path of each query in an application is determined anew. This exposes a query to access path changes that might result in reduced performance. That is, because of the changes described above, a prior access path associated with a query might be more efficient than the new access path selected by the query processor, thereby reducing the query evaluation performance. Such a performance reduction may be intolerable in many operating environments where response times are critical and must be maintained. Thus, it may be desirable to select or influence the access path to be used in retrieving data.

Another circumstance for influencing the access path to be used occurs during development of new RDBMS applications. Generally, all query optimizers have limitations that can impede the selection of the most efficient access path. Under circumstances where the known non-optimal selection occurs, it would be advantageous to direct the query optimizer to make the "correct" or more nearly optimal choice.

Finally, it may be advantageous to specify access paths in conjunction with development and testing of new database functions. For example, by specifying access paths, particular query plans can be exercised and regular operation can be optimized. Moreover, known problems with query plans or query statements can be re-created and solved by investigating different access paths. For all these reasons, it can be beneficial to influence the access path to be used by the SQL optimizer.

Influencing the Access Path Selection

Conventionally, it is possible to influence the access path selected by the query optimizer to retrieve data from desired table locations by providing the query optimizer with database statistics that likely will cause it to select the desired access path. Unfortunately, the access path that ultimately will be used by the optimizer cannot be specified with great precision using this method. Alternatively, some RDBMS interfaces permit the insertion of comments or "hints" in a query so that certain aspects of the access path for retrieval are specified for the optimizer. For example, it might be possible to specify "USE INDEX_1" in a query to force a table index (such as index_1) to be used during a query evaluation step. Such comments are useful primarily with rather simple queries, and like the statistics "trick" are somewhat limited in their ability to precisely specify the desired access path. In addition, the "hint" provided may actually specify an invalid access path that cannot be used. This could cause the query evaluation to fail and can complicate troubleshooting. Finally, another way to influence the access path selected by an optimizer is to use redundant predicates in a query. This may have the effect of directing the optimizer to retrieve data from desired tables. While none of these schemes will permit precise specification of an access path, they can increase the likelihood that the optimizer will choose data from desired tables or otherwise retrieve data using a desired access path.

From the discussion above, it should be apparent that there is a need for a relational database management system that permits specifying a desired access path with particularity and predictability. The present invention fulfills this need.

SUMMARY OF THE INVENTION

The present invention provides precise and efficient user specification of query access paths to be used in executing a query of a relational database management system (RDBMS). A query processor operating in accordance with the present invention responds to an existing query binding function, through which the user indicates that an access plan will be specified. The desired access path can then be received and implemented by the processor. In addition, the processor can report to the user on the access path being utilized by the optimizer, providing the user with the option of using that access path or substituting a different path. In particular, a query optimizer in accordance with the invention responds to an indication that the user wants to specify an access path by accepting that path, validating the path, and then utilizing the user-specified path, or utilizing default processor-selected path values if the user has specified invalid parameters. The query optimizer optionally reports the access path being utilized, whether the access path was specified by the user or was selected by the optimizer, to provide an access path explanation. In the case of a user-specified access path, some parameters not specified by the user may be automatically set by the optimizer in the course of its normal operation. In this way, the optimizer permits precise user specification of access paths and validation of the user-selected access path with minimal modification to the user interface.

The access path explanation option permits the user to request a report on the optimizer-selected path and then submit another query with an alternate user-selected access path. That is, the optimizer-selected path can be modified and then the modified path can be provided to the query processor, which will then use the modified plan after validation. By initially making an access path selection and reporting it to the user, the query processor in accordance with the invention permits the user to obtain a starting point for access path specification, giving the user the opportunity of more precisely "tuning" the access path to be used. Rather, the user can iteratively modify the access path, if desired. This avoids the necessity of the user generating an access path without assistance and effectively permits the user to receive "hints" from the query processor. The validation of the user-specified access path ensures that no operational errors will result from utilization of the user-specified access path. Finally, use of an existing function that explains the access path selected by the optimizer means that users should more readily be comfortable in utilizing the processor interface as modified by the present invention.

Other features and advantages of the present invention should be apparent from the following description of the preferred embodiment, which illustrates, by way of example, the principles of the invention.

DESCRIPTION OF THE PREFERRED EMBODIMENTS

Figure 1:
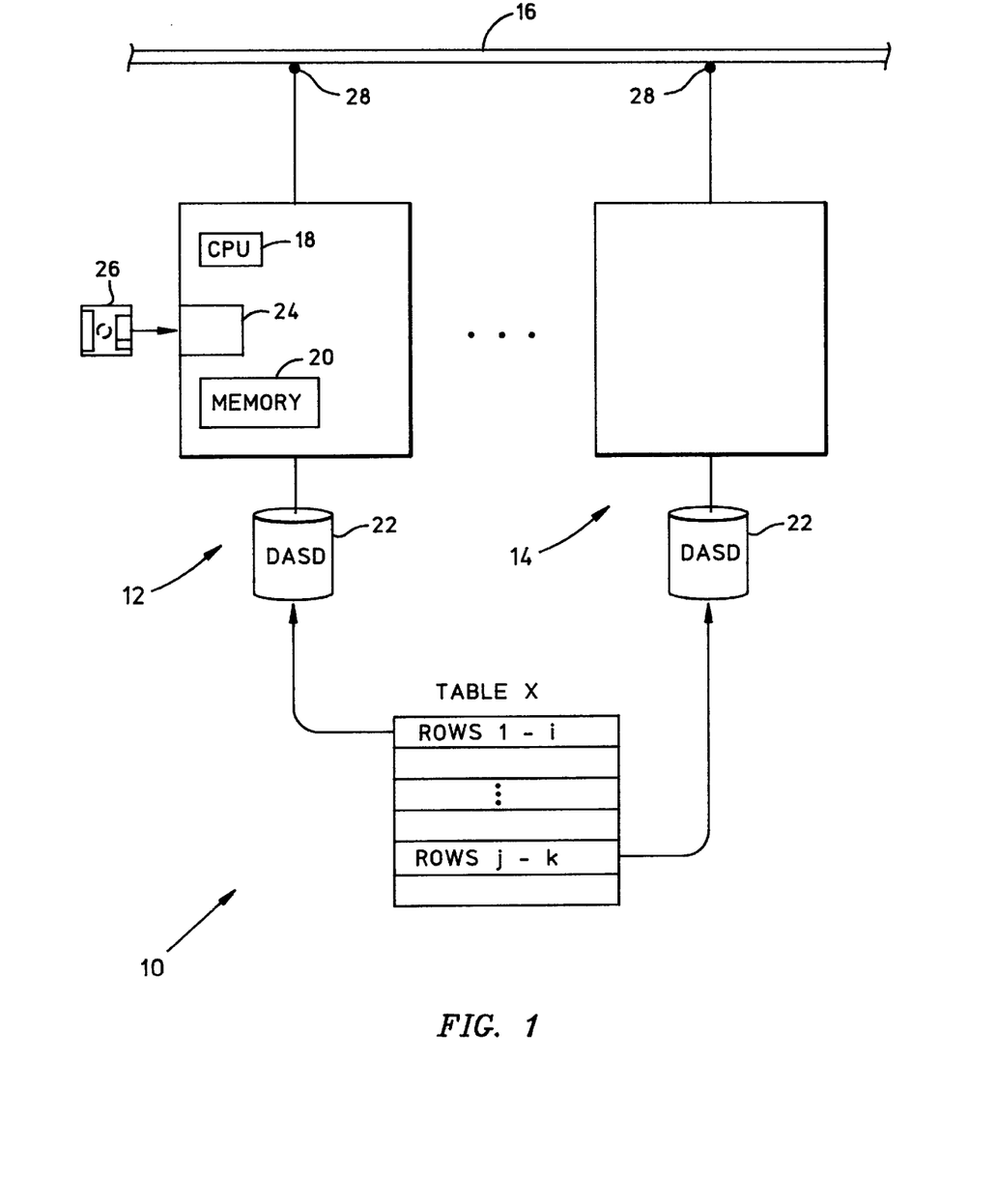
FIG. 1 is a representation of a computer network system constructed in accordance with the present invention.

FIG. 1 illustrates an exemplary computing system 10 constructed in accordance with the present invention. The preferred embodiment will be described with respect to a network implementation, but it should be understood that the invention in no way depends on a network configuration for successful implementation. The exemplary system 10 includes multiple computers, two of which 12, 14 are shown, connected to a communication network 16 in a massively parallel processing (MPP) shared-nothing configuration. Each of the computers 12, 14 has a similar construction, so that details described with respect to one computer will be understood to apply to all computers of the system. Each computer includes a central processing unit (CPU) 18, an operating main memory 20, and a local direct access storage device (DASD) 22, such as a disk drive. Each computer communicates with the others via the network 16, thereby comprising a network node.

The DASD units 22 of each computer contain table data that comprises a relational database management system (RDBMS). An application program provides an RDBMS interface to the users and can reside in each computer 12, 14 or can be installed on a single file server computer of the network. In the illustrated system 10, data files of the RDBMS are distributed across the DASD units of the network. Thus, a Table X of the RDBMS shown in FIG. 1 having multiple rows is stored across the computers of the network 16 such that rows 1 through i, for example, are stored in DASD of the first computer 12, rows j through k are stored in DASD of the second computer 14, and the remaining rows are stored in other computers (not illustrated). In this way, each table is stored across a set of the network nodes and access paths across different nodes likely be required to retrieve different portions of the tables.

In the preferred embodiment, the RDBMS comprises an SQL system stored in operating memory 20 of each machine. A user at a computer of the network 16 can pose a query for solution by the query processor of the SQL interface. The SQL interface can comprise, for example, the "DB2" product from International Business Machines (IBM) Corporation. In accordance with the invention, a user can specify a query access path to be used in executing an SQL query by using a modified version of the existing DB2 system "BIND" operation, which associates a query with an access path. More particularly, when a user submits a query, the user can optionally include a BIND operation parameter that the query processor of the SQL interface will recognize as an indication that the user will be providing an access path to be utilized with the query. This BIND flag thereby provides a simple means of indicating to the query processor when the user wants to specify an access path.

In accordance with the DB2 system, the user also can specify a BIND operation parameter that initiates an EXPLAIN function, which causes the query processor to provide a report, or explanation, of the access path being used with the query. It should be appreciated that a user can submit a query, specify the EXPLAIN function, utilize default SQL processing whereby the optimizer selects an access path for the query, and then examine the optimizer-selected path. If the user desires a different access path, the user can re-submit the query, set the BIND flag value that indicates a user-specified access path, and then provide a desired access path. In this way, a user need not be responsible for generating the initial access path to be used. Rather, a user can have the optimizer generate an initial access path and then modify that path as desired, using the BIND flag. In the preferred embodiment, the EXPLAIN function interface is table oriented and provides a convenient user interface to communicate the specification of a desired access path.

As noted above, a DB2 user conventionally specifies, or invokes, the EXPLAIN function and, in response, the query processor will display the access path it has selected for the query upon query optimization in a PLAN_TABLE format. In accordance with the invention, a user invoking the EXPLAIN function can set a flag in the PLAN_TABLE data, which the query processor recognizes as an indication that the user wants to specify an access path to be used with the query in place of the optimizer-selected choice. That is, the user can change the PLAN_TABLE access path table and set the specified-path flag, thereby replacing the processor-selected choice with the user's choice. In this way, the user provides an entry for the PLAN_TABLE access path table that specifies an access path, which is accepted by the query processor. The processor will confirm the validity of the user-provided access path and, if it is validated, the processor will use the provided path to retrieve data. Thus, the user can provide a specific, desired access path using the EXPLAIN interface. In this way, the query processor permits precise user specification of access paths and validation of the user-selected access path with minimal modification to the user interface. The PLAN_TABLE access path table configuration will be explained in greater detail below, after the network operating environment of the preferred embodiment is first described.

a. Network Configuration

Each computer CPU 18 performs its functions by executing instructions stored in the operating memory 20. The instructions can be received through an optional storage drive 24 or through an interface with the network 16. The storage drive permits a program product storage device 26 to be received and for program steps recorded on the program product storage device to be read and transferred into the operating memory 20. In this way, the processing steps necessary for operation in accordance with the invention can be embodied on a program product. Those skilled in the art will appreciate that the program products can comprise machine-readable storage devices 26 such as magnetic media disks on which are recorded program instructions whose execution implements the RDBMS of the present invention. The storage devices 26 also can comprise, for example, media such as optical disks (such as CD-ROM) and other machine-readable storage devices. Other suitable program product storage devices can include magnetic tape and semiconductor memory cards. Alternatively, the program steps can be received into the operating memory 20 from the DASD 22, or over the network 16. In the case of the latter method, the computer system includes a network interface 28 that permits communication between the CPU 18 at the first node 12 and other computer systems 14 over the network 16. In that way, the computer system 12 can receive data into the main memory 20 through the interface 28 after network communication has been established by well-known methods that will be understood by those skilled in the art without further explanation.

b. RDBMS Configuration

Figure 2:
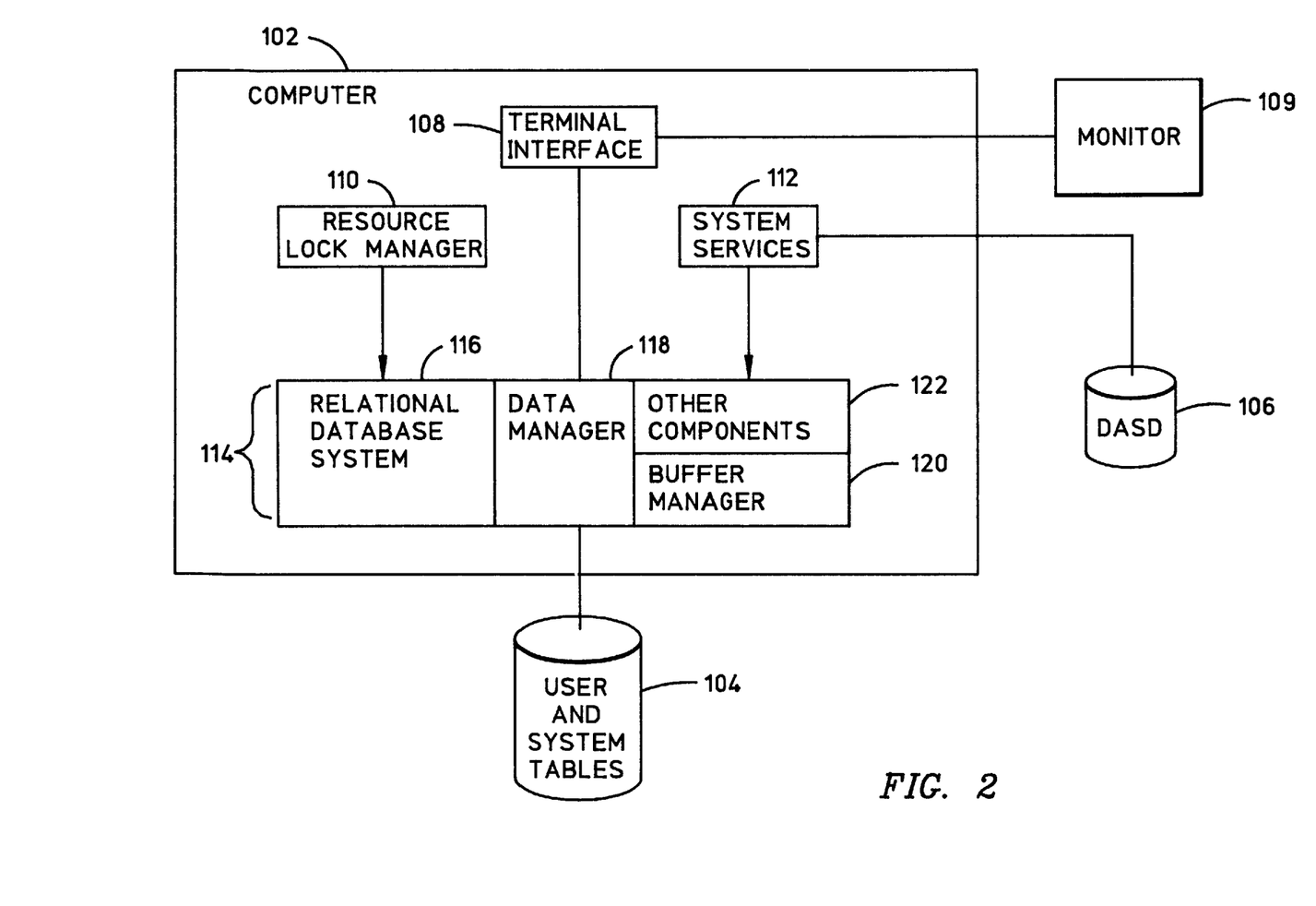
FIG. 2 is a representation of a computer processing system at a node of the FIG. 1 network that implements a relational data base management system in accordance with the present invention.

FIG. 2 illustrates a computer environment at a node 12 (see FIG. 1) of the exemplary RDBMS computing system. In the exemplary computer environment, a computer system 102 at the node accesses network data storage devices, such as disk drives, in which are stored user and system tables 104 and log data tables 106. An operator of the computer system 102 uses a standard operator terminal interface 108, such as one of the interfaces known as IMS/DB/DC, CICS, TSO, OS/2, or some other appropriate interface, to transmit electrical signals to and from the computer system that represent commands for performing various search and retrieval functions against the databases 104, 106. The commands are viewed on a visual monitor 109. These search and retrieval functions are generally referred to as queries. In the preferred embodiment of the present invention, these queries conform to the SQL standard interface, and invoke functions performed by RDBMS software. In the preferred embodiment of the present invention, the RDBMS software comprises the "DB2" product offered by the IBM Corporation for the "MVS", "AIX", or "OS/2" operating systems. Such software generally resides in memory of network-based computers. Those skilled in the art will recognize that the present invention has application to any RDBMS software that uses SQL, and may similarly be applied to non-SQL queries.

As illustrated in FIG. 2, the DB2 product architecture for the MVS operating system includes three major components: the Resource Lock Manager ("RLM") 110, the System Services module 112, and the Database Services module 114. The RLM handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing the log data sets 106, gathering system statistics, handling startup and shutdown operations, and providing management support.

At the center of the DB2 product architecture is the Database Services Processor module 114. The Database Services Processor module contains several submodules, including the Relational Database System (RDS) 116, the Data Manager 118, the Buffer Manager 120, and other database components 122, including an SQL compiler/interpreter. These submodules support the functions of the SQL language, such as definitions, access control, retrieval, and update of user and system data. The Database Services Processor module 114 preferably comprises one or more processors that execute a series of computer-executable programming instructions. These programming instructions preferably reside in storage locations such as fast-access memory 20 (see FIG. 1) of the computer 102. Alternatively, the instructions may be stored on a computer diskette 26 (FIG. 1), direct access storage device, magnetic tape, conventional "hard drive", electronic read-only memory, optical storage device, paper punch cards, or another suitable data storage medium containing logically segmented storage locations.

c. The PLAN_TABLE access path data

As noted above, and in accordance with the present invention, the SQL query processor component of the RDBMS will respond to a user-invocation of the EXPLAIN command by displaying a table view of the access path selected by the query optimizer. The optimizer first makes use of conventional optimization techniques and resources to select what it regards as an optimal access path. That is, an SQL optimizer is conventionally provided with system information such as the location of tables and parts (rows) of tables, the size of such tables, network node locations, system operating characteristics and statistics, and related information in making an initial access path selection. In the preferred embodiment, such query processing can take place in either an interactive operating mode or in a batch processing mode, both of which will be described further below.

The EXPLAIN function call in SQL has the format given below:

---
EXPLAIN Function Call
EXPLAIN PLAN [SET QUERYNO=integer] FOR (SQL statement),
--- where PLAN inserts a row in the PLAN_TABLE, FOR specifies an SQL statement to be explained, and SET QUERYNO is an optional setting of the query number that associates the integer number being set with the SQL statement being explained. The QUERYNO value will be set by the processor if the user does not specify a value.

Figure 3:
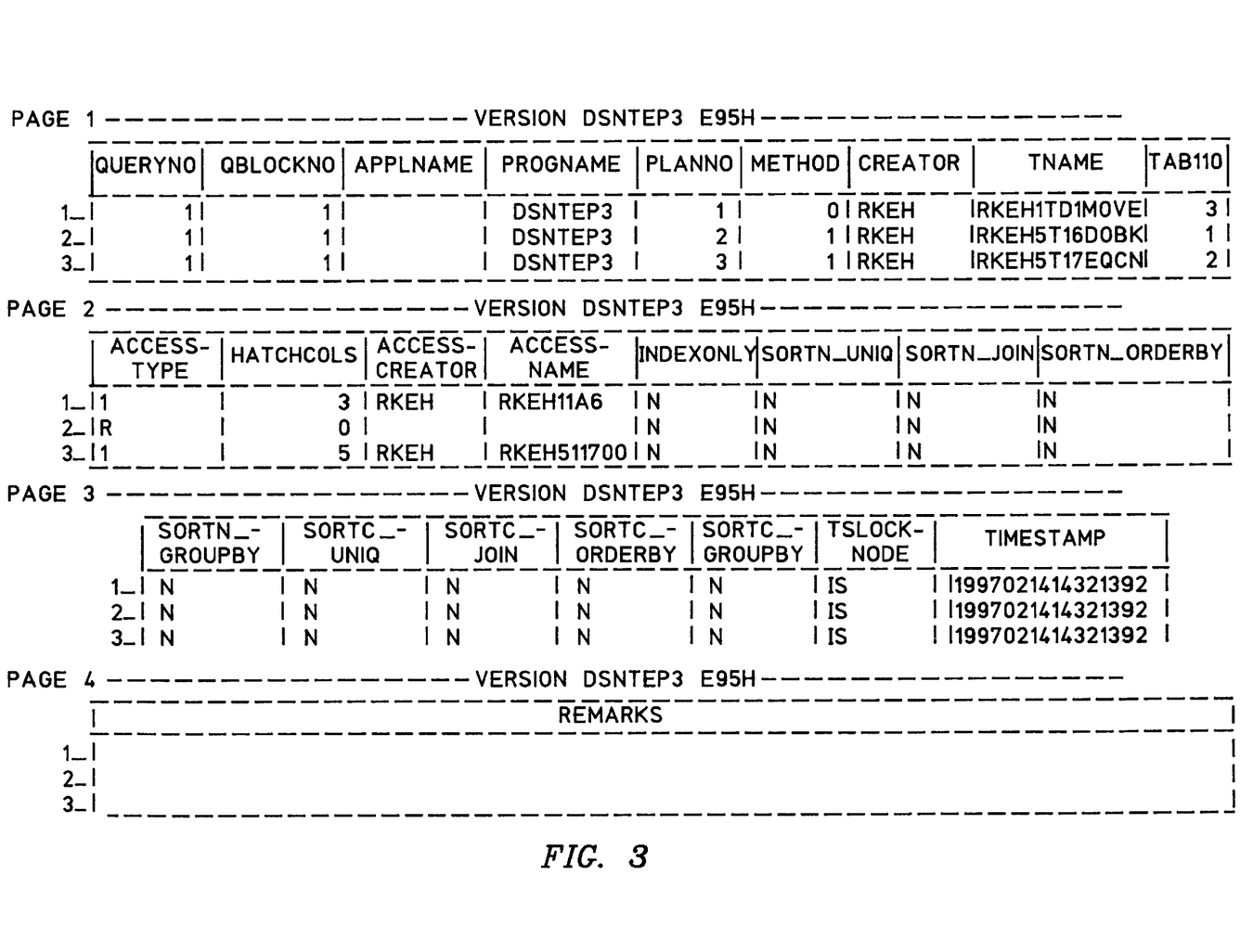
FIG. 3 is a representation of a first half-portion of the PLAN_TABLE access plan data table utilized by the computer processing system of FIG. 2 in carrying out the processing in accordance with the present invention.
Figure 4:
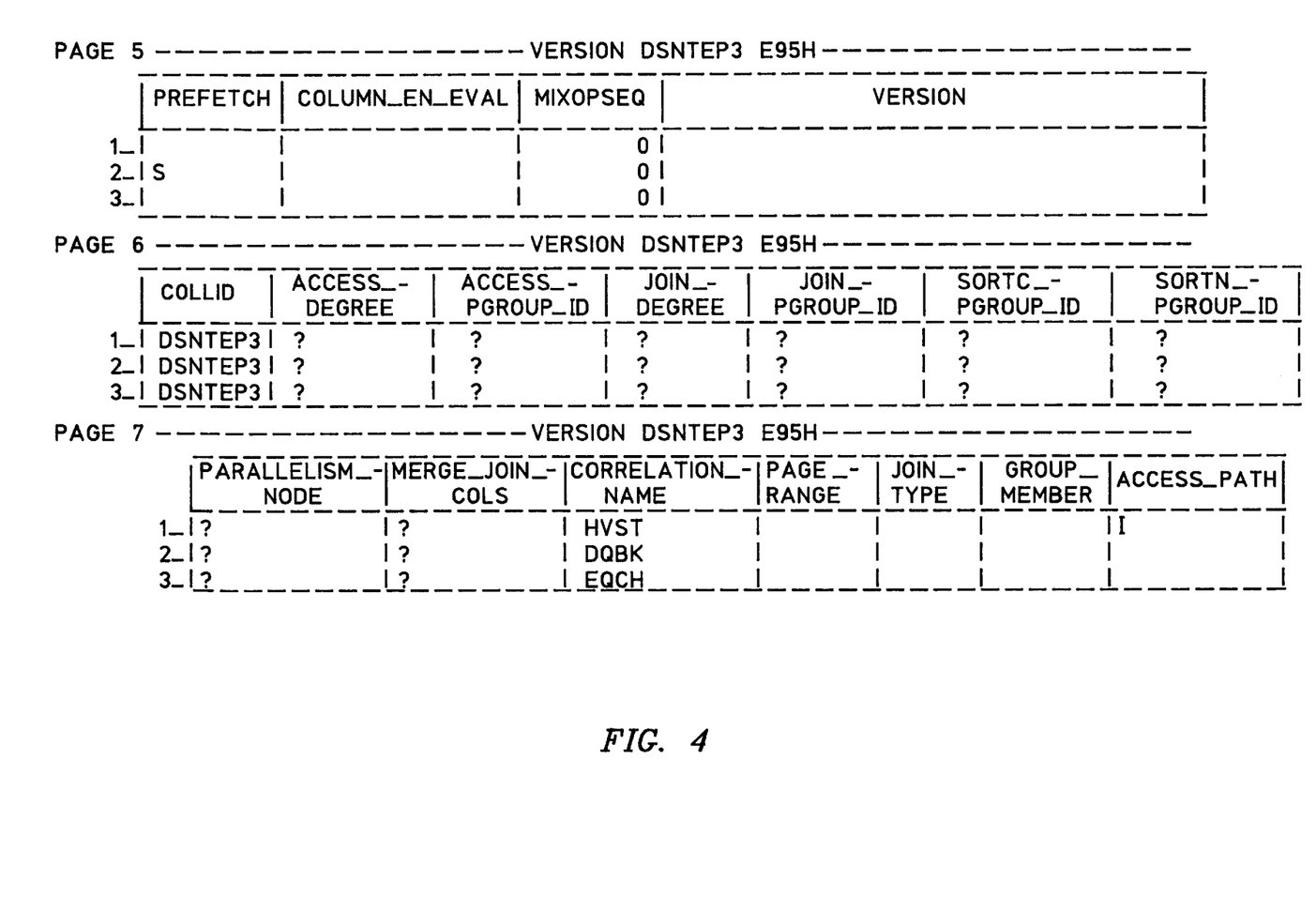
FIG. 4 is a representation of a second half-portion of the PLAN_TABLE access path data table utilized by the computer processing system of FIG. 2 in carrying out the processing in accordance with the present invention.

A representation of the PLAN_TABLE format generated by the EXPLAIN function, as viewed by a user, is provided in FIG. 3 and FIG. 4. FIG. 3 is a representation of the first four pages of a multi-page PLAN_TABLE display that would be viewed by the user on the monitor 109 (FIG. 2), and FIG. 4 is a representation of the last three pages of the PLAN_TABLE that would be viewed by the user. A user can change the monitor display from page to page of the PLAN_TABLE representation using a keyboard interaction, display mouse operation, or other user display control device. The PLAN_TABLE illustrated in FIGS. 3 and 4 is largely conventional, with the exception of the column labelled ACCESS_PATH added to the last table page, Page 7 (FIG. 4). As described further below, this added new column of the PLAN_TABLE access path table is the means by which a user can specify to the query processor a desired access path.

FIG. 3 shows Page 1 of the exemplary PLAN_TABLE with columns labelled QUERYNO, QBLOCKNO, APPLNAME, PROGNAME, PLANNO, METHOD, CREATOR, TNAME, and TABNO. These fields contain, respectively, a query number for the query referenced by the table, query block number, application name, program name, plan number, method name, creator (author) of the query, table name, and table number. Because the EXPLAIN function and PLAN_TABLE described here are for purposes of illustration only, it should be understood that the table fields described herein also are for purposes of illustration only. In particular, it should be appreciated that the EXPLAIN function and PLAN_TABLE described herein provide a convenient means of specifying a query and its associated access path and tables. Additional information associated with specification of the access path will depend on the implementation of the RDBMS in which the invention is used.

In the preferred embodiment, the SQL syntax is modified so the user can specify the value to be used as the query number, which is represented by the QUERYNO column of Page 1 of PLAN_TABLE. Being able to specify a value for the query number during the bind operation makes it easier for the user to associate a specific query with specific rows in the PLAN_TABLE representation.

Returning to FIG. 3, it can be seen that Page 2 of the PLAN_TABLE access path table includes columns labelled ACCESSTYPE, MATCHCOLS, ACCESSCREATOR, ACCESSNAME, INDEXONLY, SORTN_UNIQ, SORTN_JOIN, and SORTN_ORDERBY. These columns relate to specification of various aspects of the query and identification of the query author. Again, these columns are exemplary for the EXPLAIN function of DB2; the only information necessary for implementation of the invention relates to identification of the access path and the query with which it is associated.

In FIG. 3, Page 3 of the PLAN_TABLE access path table is shown to include columns labelled SORTN_GROUPBY, SORTC_UNIQ, SORTC_JOIN, SORTC_ORDERBY, SORTC_GROUPBY, TSLOCKHDDE, and TIMESTAMP. These columns relate to query access path parameters describing sort options, such as sort by name and sort by column and also join, order-by, and group-by options, and also relate to timestamp options with respect to the access path specified by the table entries.

Page 4 of the table shown in FIG. 3 is reserved for remarks, and is the means by which the EXPLAIN function permits a user to annotate access path specifications.

Page 5 of the PLAN_TABLE access path table is illustrated in FIG. 4. Page 5 shows columns labelled PREFETCH, COLUMN_FN_EVAL, MIXOPSEQ, and VERSION. These columns relate to query parameters and do not affect implementation of the access path specification in accordance with the invention.

Page 6 of the table is shown in FIG. 4 and shows columns labelled COLLID, ACCESS_DEGREE, ACCESS_PGROUP_ID, JOIN_DEGREE, JOIN_PGROUP_ID, SORTC_PGROUP_ID, and SORTN_PGROUP_ID. As with the Page 5 columns, these do not affect implementation of the access path specification in accordance with the present invention. Page 6 of the PLAN_TABLE access path table does, however, provide a means for specifying the degree of parallelism desired in the system operation and processing of tables, both with respect to table data handling and input/output. Those skilled in the art will be familiar with the details of selecting SQL table parallelism options and the advantages of doing so.

Page 7 of the PLAN_TABLE access path table, shown in FIG. 4, includes columns labelled PARALLELISM_MODE, MERGE_JOIN_COLS, CORRELATION_NAME, PAGE_RANGE, JOIN_TYPE, GROUP_MEMBER, and ACCESS_PATH. As noted above, the ACCESS_PATH column is not a column in a conventional PLAN_TABLE access path table and is the means by which the user can precisely specify an access path for use by the query optimizer. In the preferred embodiment, an entry of "I" in the ACCESS_PATH column is recognized by the query processor as a flag to indicate that the access path parameters in the PLAN_TABLE access path table are to be inserted in place of any values originally in place there. Moreover, in the preferred embodiment, a user can search on fields in PLAN_TABLE, including QUERYNO, APPLNAME, PROGNAME, VERSION, and COLLID. It should be noted that these search fields permit a very extensive and flexible user specification of access path parameters. In addition, setting the QUERYNO value permits setting the query number to be "synchronized" or more easily correlated with the PLAN_TABLE number called up during query optimization after detecting the BIND flag indicating a user-specified access path.

It should be appreciated that, in the preferred embodiment, the query processor determines an access path using these fields of the PLAN_TABLE: METHOD, CREATOR, TNAME, CORRELATION_NAME, TABNO, ACCESSTYPE, ACCESSCREATOR, ACCESSNAME, SORTN_JOIN, SORTC_JOIN, PREFETCH, PAGE_RANGE, PARALLELISM_MODE, ACCESS_DEGREE, ACCESS_PGROUP ID, JOIN DEGREE, and JOIN_PGROUP_ID. These fields, together with the searched-on fields listed above, will define an access path uniquely and with particularity.

Invoking the BIND access path flag and providing access path data in the PLAN_TABLE access path table is initiated by a user in job control language (JCL) that is specified when an SQL session is begun by the user, either in an interactive mode or in a batch processing environment. In response to the EXPLAIN invocation, the query processor will optionally display (or print out) the access path decided upon by the processor during the query optimization processing phase mentioned above and described further below. If the user either interactively inputs (changes) a BIND_OPTION column value and associated access path specifications of the PLAN_TABLE access path table, or provides supplemental PLAN_TABLE data with the BIND_OPTION value set in the SQL batch processing data, then the processor will accept the new access path data, validate it, and use it in place of the PLAN_TABLE data otherwise produced. That is, the user-specified access path will override the access path selected by the processor. Such processing is described further below in conjunction with FIG. 7.

An example of using the EXPLAIN function in SQL is given by Table 1 below. The Table 1 example illustrates a case where it is desired to know the steps required to execute the given SELECT query (assume that no set of rows in the PLAN_TABLE has the value '13' for the QUERYNO column):

TABLE 1

EXPLAIN PLAN SET QUERYNO = 13
FOR SELECT X.ACTNO, X.PROJNO, X.EMPNO, Y.JOB, YEDLEVEL
  FROM DSN8410.EMPPROJACT X, DSN8410.EMP Y
  WHERE X.EMPNO = Y.EMPNO
    AND X.EMPTIME > 0.5
    AND (Y.JOB = 'DESIGNER')
  ORDER BY X.ACTNO, X.PROJNO;

The information generated by the Table 1 EXPLAIN function call could be retrieved by the following query of Table 2:

TABLE 2

SELECT * FROM PLAN_TABLE WHERE QUERYNO = 13
  ORDER BY QBLOCKNO, PLANNO, MIXOPSEQ;

As noted above, and in accordance with the present invention, the SQL query processor component of the RDBMS will respond to submission of a user query invoking the EXPLAIN function and the BIND_OPTION by providing the SQL optimizer with rewritten SQL code that produces a PLAN_TABLE access path table with the processor-selected access path for the query, and permits user-specification of the access path by receiving user changes to the access path specified in the table. Also as noted above, in the preferred embodiment, such query processing can take place in either an interactive operating mode or in a batch processing mode. Both of these modes will next be described, first one and then the other.

d. Interactive SQL Execution

Figure 5:
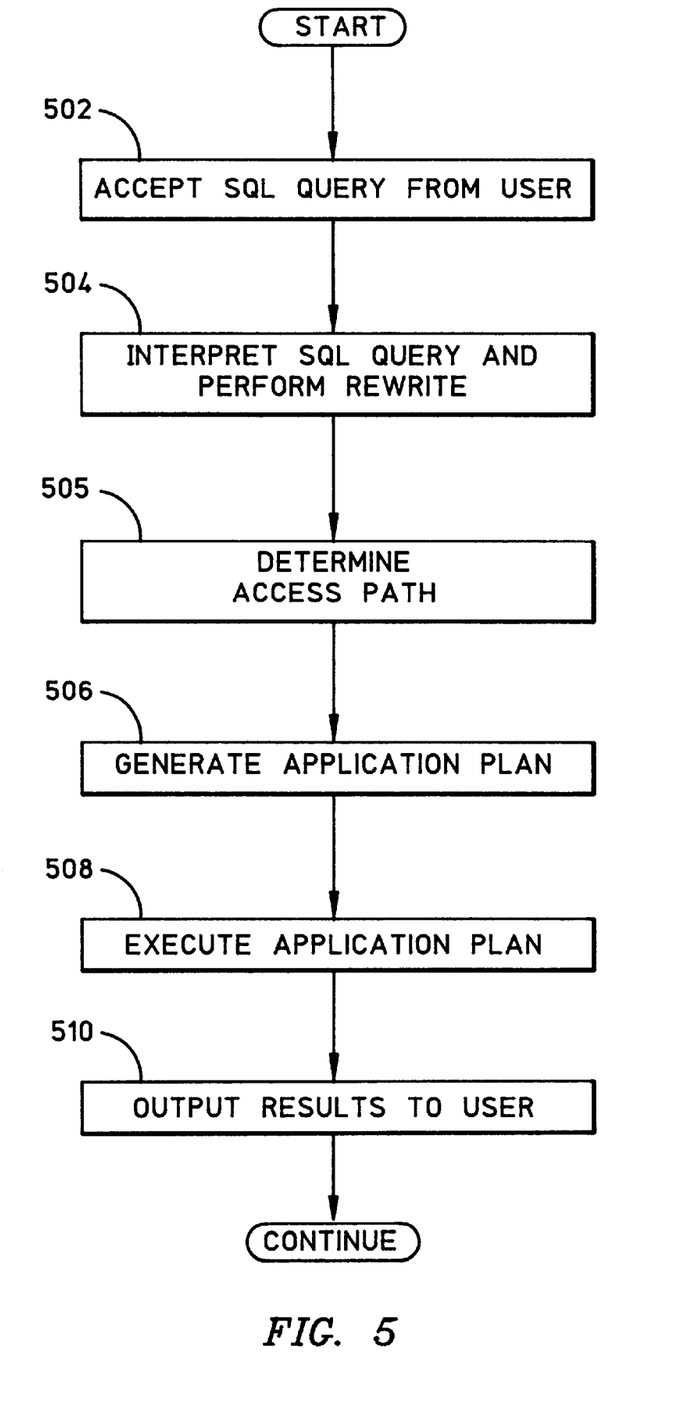
FIG. 5 is a flow diagram that illustrates the processing steps executed by the computer processing system of FIG. 2 to interpret and execute an SQL statement in an interactive environment, incorporating the user-specified access path feature of the invention.

FIG. 5 is a flow diagram that illustrates the operating steps necessary for the interpretation and execution of SQL statements in an interactive network environment such as shown in FIG. 1, in accordance with the present invention. These steps are implemented as computer program steps stored in one of the network computers 12, 14. The first flow diagram box of FIG. 5, numbered 502, represents the input of an SQL statement into the computer system from the user, where the computer first accepts a query from the user. Inclusion of the BIND_OPTION value in the query received from the user will trigger the special processing in accordance with the invention. The next flow diagram box 504 of FIG. 5 represents the step of compiling or interpreting the received SQL statement and then optimizing the rewritten code according to well-known transformations, thereby generating a query plan. After the compilation and interpretation step, the processor performs the step of determining the access path, represented by the flow diagram box numbered 505. As noted above, generation of the query plan and selection of an access path involves processor consideration of both the available access paths (indexes, sequential reads, etc.) and system-held statistics on the data to be accessed (the size of the table, the number of distinct values in a particular column, etc.), to choose what the RDBMS processor considers to be the most efficient access path for the query. The selection of the most efficient access path utilizes query, database, and system information that is conventionally available to SQL optimizers. The selected query plan can be displayed to the user in response to the inclusion of the EXPLAIN function in the user interactive commands.

In the processing of step 505, if the user has provided a query with the user access path BIND flag set, the query processor responds to the PLAN_TABLE data that is input by validating the user-input access path data and substituting it, if valid, into the access path otherwise selected for the query. In the preferred embodiment, this processing is performed by the query optimizer, and therefore could be considered part of the optimization processing of the flow diagram box numbered 504, but is illustrated separately in FIG. 5 for purposes of explanation. The FIG. 5 flow diagram box numbered 506 represents the step of generating a compiled set of runtime structures called an application plan from the rewritten SQL statements. The application plan represents the computer-generated sequence of operations to obtain the data specified by the user query. The FIG. 5 flow diagram box numbered 508 represents the execution of the application plan. The last block 510 in FIG. 5 represents the output of the results of the application plan to the user.

e. Embedded/Batch SQL Execution

Figure 6:
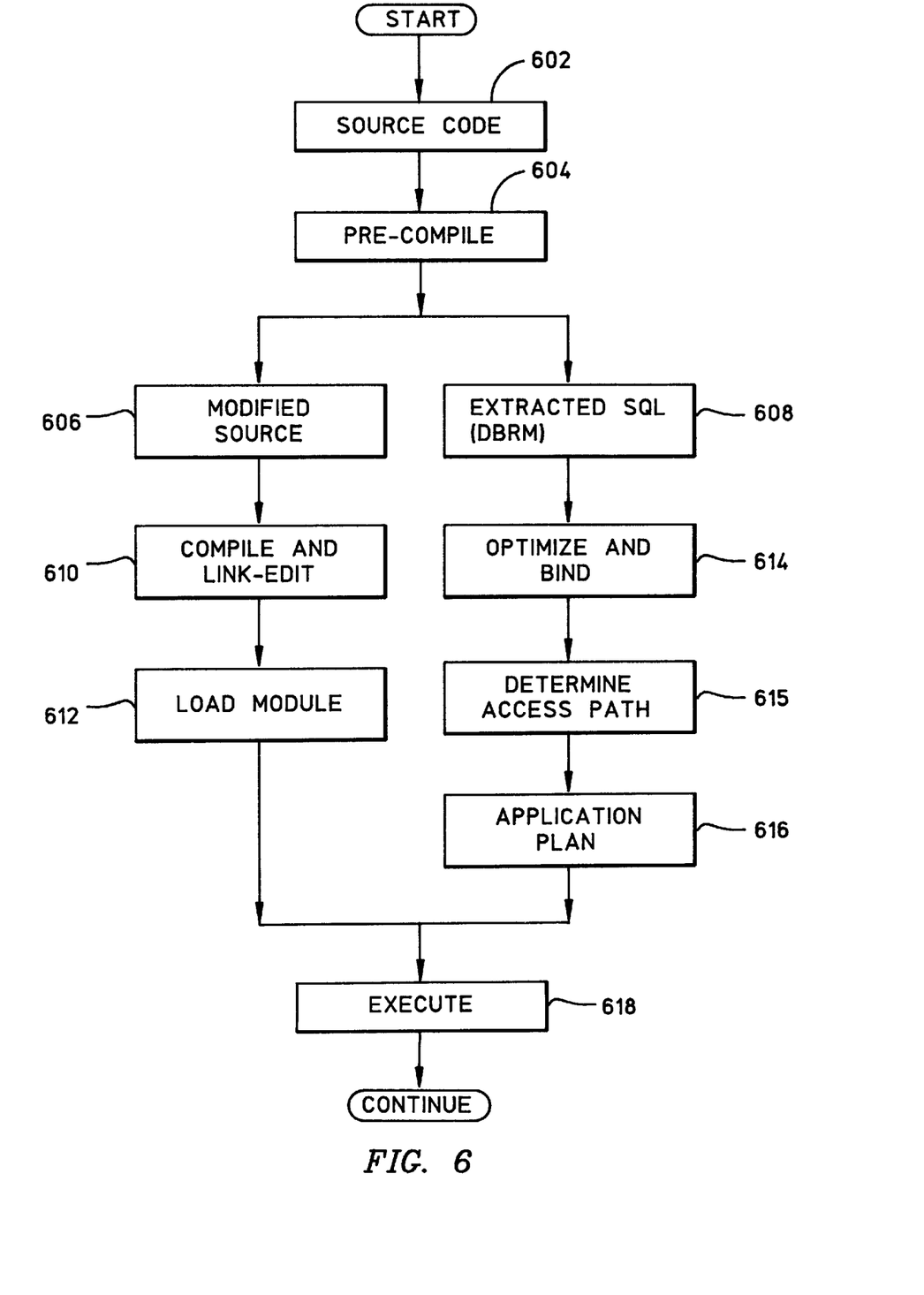
FIG. 6 is a flow diagram that illustrates the processing steps executed by the computer processing system of FIG. 2 to interpret and execute an SQL statement embedded in source code, incorporating the user-specified access path feature of the invention.

FIG. 6 is a flow diagram that illustrates the steps necessary for the interpretation and execution of SQL statements embedded in source code for batch operation according to the present invention. The first block 602 represents program source code containing a host language (such as COBOL or C) and embedded SQL statements that is received by the RDBMS processor for batch processing. This code comprises a user query and, just as was the case for the described interactive processing (FIG. 5), if the query includes the BIND_OPTION flag, the special processing in accordance with the invention will be triggered. The received program source code is next subjected to a pre-compile step 604. There are two types of output code from the pre-compile step 604: a modified SQL source module 606 and a Database Request Module ("DBRM") 608. The modified SQL source module 606 contains host language calls to the DB2 program, which the pre-compile step 604 inserts into the pre-compile output code in place of the SQL source statements. The other output of the pre-compile step, the DBRM 608, consists of the SQL statements from the program source code 602.

After the modified source 606 is produced, a compile and link-edit step 610 uses the modified source output to produce a load module 612, while an optimize and bind step 614 uses the DBRM output 608 to produce a compiled set of runtime structures for the application plan 616. As indicated above in conjunction with the description of FIG. 5, the SQL statements from the program source code 602 specify or invoke the EXPLAIN function supported by SQL. The optimize and bind step considers both the available access paths (indexes, sequential reads, etc.) and system held statistics on the data to be accessed (the size of the table, the number of distinct values in a particular column, etc.), to choose what it considers to be the most efficient access path for the query. In the preferred embodiment, the optimize and bind step 614 optimizes the SQL query and, if additional PLAN_TABLE data is provided by the user in the batch data file, responds to the user access path BIND flag with supplemental PLAN_TABLE access path data table processing. The supplemental PLAN_TABLE access path table processing is represented in FIG. 6 by the flow diagram box numbered 615. The load module 612 and application plan 616 are then executed together at the last step, represented by the flow diagram box numbered 618.

f. BIND Flag Processing in Accordance With the Invention

Figure 7:
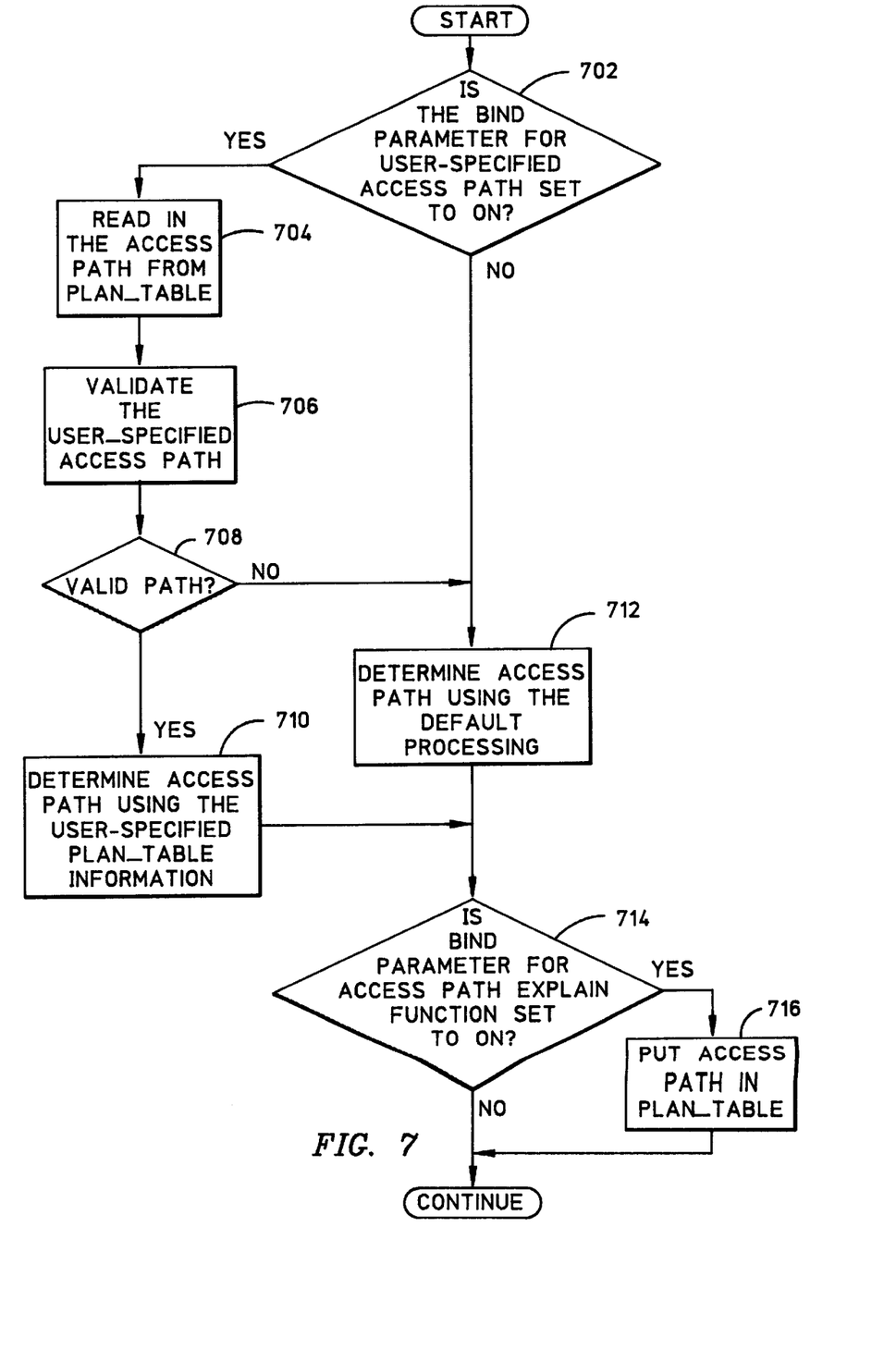
FIG. 7 is a flow diagram that illustrates the processing steps executed by the computer processing system of FIG. 2 to incorporate the access path specified in accordance with either the FIG. 5 interactive processing or the FIG. 6 batch processing.

In accordance with the invention, the RDBMS processor (FIG. 2) responds to a BIND flag in the query by receiving user-specified access path data in the PLAN_TABLE for the query being processed. In this way, selection of an execution plan using the access path desired by the user is assured. FIG. 7 is a flow diagram that represents the user-specified access path processing steps performed by the SQL processor of the invention. In particular, FIG. 7 represents the processing steps performed in the access path determination, post-optimization steps of FIG. 5 (box 505) and of FIG. 6 (615).

In the first step of FIG. 7, illustrated by the flow diagram decision box numbered 702, the processor checks the access path BIND flag value in the query data. If the flag is set, an affirmative outcome at the decision box, then the user will specify the access path, and in response the processor will retrieve the user-specified access path from the PLAN_TABLE data. The path data retrieving step is indicated by the flow diagram box numbered 704. In the next processing step, represented by the flow diagram box numbered 706, the processor validates the access path selected by the user via the PLAN_TABLE data. The processing steps carried out in validating the user-specified access path will depend on the RDBMS implementation of the system, and will be understood by those skilled in the art. For example, the processor will indicate an error if the user-specified access path in the PLAN_TABLE data references tables that are not in the system. In the preferred embodiment, the validation processing is performed by the query processor, but could be performed by another module of the RDBMS (FIG. 2), if desired.

If the access path data provided by the user is valid, an affirmative outcome at the decision box numbered 708, then the processor determines the access path using the user-specified data in the PLAN_TABLE. This step is represented by the flow diagram box numbered 710. If the user-specified access path data is not valid, a negative outcome at the decision box numbered 708, then the processor determines the access path by substituting one or more access path parameters using default processing, as indicated by the flow diagram box numbered 712. That is, the processor conventionally determines the access path to be used with any query, and if any parameters of the user-specified path are invalid, the processor uses the parameters it has determined.

In the next step of access path table processing, represented by the flow diagram decision box numbered 714, the processor checks the query BIND parameter that indicates if the user wants to invoke the EXPLAIN function. If the BIND parameter is set, an affirmative outcome at the decision box, then the processor places the access path data in the PLAN_TABLE so it will be provided to the user, in a predetermined report format. This processing is represented by the flow diagram box numbered 716. Processing then continues with the execution plan, as described above in connection with the description of FIG. 5 at box 506 and FIG. 6 at box 616.

It should be noted that the FIG. 7 processing path from box 702 to box 712 and then 714 is conventional. It also should be noted that a user can use the default access path processing (the path specified by boxes 702–712–714) to obtain an access path as generated by the processor, and then examine that path using the EXPLAIN function. If desired, the user then can submit a query with the user access path BIND flag set to force the processor to use a modified version of that access path.

Advantages of the Invention

Adding a BIND flag triggers the query optimizer of a system constructed in accordance with the invention to read PLAN_TABLE data provided by the user. In an interactive mode of operation, the BIND flag is set with the query that is input by the user. In a batch processing environment, the invocation of the BIND flag is set in job control language provided by the user in the batch data. In either case, the user indicates to the processor that access path data is being provided by setting a column of the PLAN_TABLE data to a flag value. The processor thereby locates the access path data as provided by the user in the PLAN_TABLE data, using validated user data to override any alternative processor-generated access path. It should be understood that, although the processing of the access path data from the user is described above as being performed by the query optimizer, the user access path data could just as well be communicated through another data table or in another format. What must be provided is an indication to the query processor that the user will be providing access path data as well as identification of where that data may be found.

Using the EXPLAIN function in accordance with the invention permits the user to have a starting point for the access path, if desired. That is, a user may modify the access path that otherwise will be used by the processor. This advantageously eliminates the need for the user to generate an access path, which a user might have difficulty providing in the absence of great experience with RDBMS operations. As illustrated by the column values of the PLAN_TABLE access path table (FIGS. 3 and 4), the access path can be specified by the user with relatively great specificity. In contrast, conventional means for influencing access path selection by the query processor is generally limited to providing "hints" to the processor, comprising somewhat vague word descriptions of the desired access path or sub-parts of an application plan, rather than access path specification in terms of the actual data table parameters and specifications of the computer system containing the RDBMS.

Thus, a relational data base management system constructed in accordance with the present invention includes a query processor that permits consideration of alternative user-specified access paths, which the processor will validate and incorporate into the query execution plan.

The present invention has been described above in terms of a presently preferred embodiment so that an understanding of the present invention can be conveyed. There are, however, many configurations for SQL-processing relational data base management systems not specifically described herein but with which the present invention is applicable. The present invention should therefore not be seen as limited to the particular embodiment described herein, but rather, it should be understood that the present invention has wide applicability with respect to SQL processing relational data base management systems generally. All modifications, variations, or equivalent arrangements and implementations that are within the scope of the attached claims should therefore be considered within the scope of the invention.

We claim:

1. A method of processing a query in a relational database management system that generates an application plan to retrieve desired data from computer storage in response to the query, the method comprising the steps of:
   receiving a query containing data defining a user-specified access path to be used in executing the application plan; and
   validating the user-specified access path such that any invalid access path parameters are replaced with default values selected by the system.

2. A method as defined in claim 1, wherein the step of receiving comprises the steps of:
   detecting a parameter of the query that indicates an access path will be specified by the user; and
   retrieving a data table that specifies the access path desired by the user.

3. A method as defined in claim 2, wherein the data table comprises a data table that is generated by the system when it generates the application plan.

4. A method as defined in claim 3, wherein the detected access path parameter comprises an EXPLAIN function call of SQL.

5. A method as defined in claim 2, wherein the data table includes data that specifies processing parallelism parameters.

6. A method as defined in claim 1, wherein the step of validating comprises the steps of:
   determining if any of the access path parameters are invalid;
   selecting default valid parameters to replace the invalid parameters; and
   using the selected default parameters in place of the invalid parameters.

7. A method as defined in claim 6, further including the step of displaying the access path parameters, including those selected by the system.

8. A method as defined in claim 1, wherein the system includes a query optimizer that generates access path parameters in response to a user request to explain a selected access path, and that receives user-specified data that overrides the optimizer-generated access path parameters.

9. A relational database management system comprising:
   a central processing unit;
   a plurality of data storage devices in which relational data is stored for retrieval by the relational database management system; and
   a query processor that receives relational queries from a system user and processes them to retrieve data from the data storage devices, wherein the query processor
      receives a query containing data defining a user-specified access path to be used in executing the application plan, and
      validates the user-specified access path such that any invalid access path parameters are replaced with default values selected by the system.

10. A system as defined in claim 9, wherein the query processor detects a parameter of the relational query that indicates an access path will be specified by the user and retrieves a data table that specifies the access path desired by the user for processing of the relational query.

11. A system as defined in claim 10, wherein the data table comprises a data table that is generated by the query processor when it generates the application plan.

12. A system as defined in claim 11, wherein the detected access path parameter comprises an EXPLAIN function call of SQL.

13. A system as defined in claim 10, wherein the data table includes data that specifies processing parallelism parameters.

14. A system as defined in claim 9, wherein the query processor validates by determining if any of the access path parameters are invalid, selecting default valid parameters to replace the invalid parameters, and using the selected default parameters in place of the invalid parameters.

15. A system as defined in claim 14, wherein the query processor displays the access path parameters, including those selected by the system.

16. A system as defined in claim 9, wherein the system further includes a query optimizer that generates access path parameters in response to a user request to explain a selected access path, and that receives user-specified data that overrides the optimizer-generated access path parameters.

17. A program product data storage device, tangibly embodying a program of machine-readable instructions executable by a computer system connected to a computer network, the program product comprising:

a recordable media;

a relational data base management system (RDBMS) recorded on the recordable media, the RDBMS having a query processor that executes steps of receiving a query containing data defining a user-specified access path to be used in executing the application plan, and validating the user-specified access path such that any invalid access path parameters are replaced with default values selected by the system.

18. A program product as defined in claim 17, wherein the query processor executed step of receiving comprises the steps of:

detecting a parameter of the query that indicates an access path will be specified by the user; and retrieving a data table that specifies the access path desired by the user.

19. A program product as defined in claim 18, wherein the data table comprises a data table that is generated by the system when it generates the application plan.

20. A program product as defined in claim 19, wherein the detected access path parameter comprises an EXPLAIN function call of SQL.

21. A program product as defined in claim 18, wherein the data table includes data that specifies processing parallelism parameters.

22. A program product as defined in claim 17, wherein the query processor executed step of validating comprises the steps of:

determining if any of the access path parameters are invalid;

selecting default valid parameters to replace the invalid parameters; and using the selected default parameters in place of the invalid parameters.

23. A program product as defined in claim 22, further including the step of displaying the access path parameters, including those selected by the system.

24. A program product as defined in claim 17, wherein the system further includes a query optimizer that generates access path parameters in response to a user request to explain a selected access path, and that receives user-specified data that overrides the optimizer-generated access path parameters.

* * * * *